Nov. 12, 1929.    J. L. SMITH    1,735,018
LIGHTING DEVICE
Filed Sept. 3, 1925    2 Sheets-Sheet 1

INVENTOR
Joseph L. Smith
BY
ATTORNEY

Nov. 12, 1929.   J. L. SMITH   1,735,018
LIGHTING DEVICE
Filed Sept. 3, 1925   2 Sheets-Sheet 2

INVENTOR
Joseph L. Smith
BY
ATTORNEY

Patented Nov. 12, 1929

1,735,018

UNITED STATES PATENT OFFICE

JOSEPH L. SMITH, OF BUFFALO, NEW YORK, ASSIGNOR TO DE LUXE ELECTRIC LIGHTER COMPANY, INC., OF NEW YORK, N. Y., A CORPORATION OF NEW YORK

LIGHTING DEVICE

Application filed September 3, 1925. Serial No. 54,387.

My invention relates in general to lighting devices, and more particularly to such devices as have a torch which is ignited by an electric spark.

It has been an object of my invention to provide a device of this nature which shall be economical in current consumption and at the same time produce an effective igniting spark.

Another object has been to provide a device by which the operator will not receive a shock even if he attempts to operate the same with a metallic instrument.

Moreover, I have sought to provide a lighting device which shall be perfectly safe to operate and which shall meet the Fire Underwriters' requirements.

Furthermore, my device is inexpensive to manufacture and durable in operation.

The above objects and advantages have been accomplished by the device shown in the accompanying drawings, of which:

Figure 1:
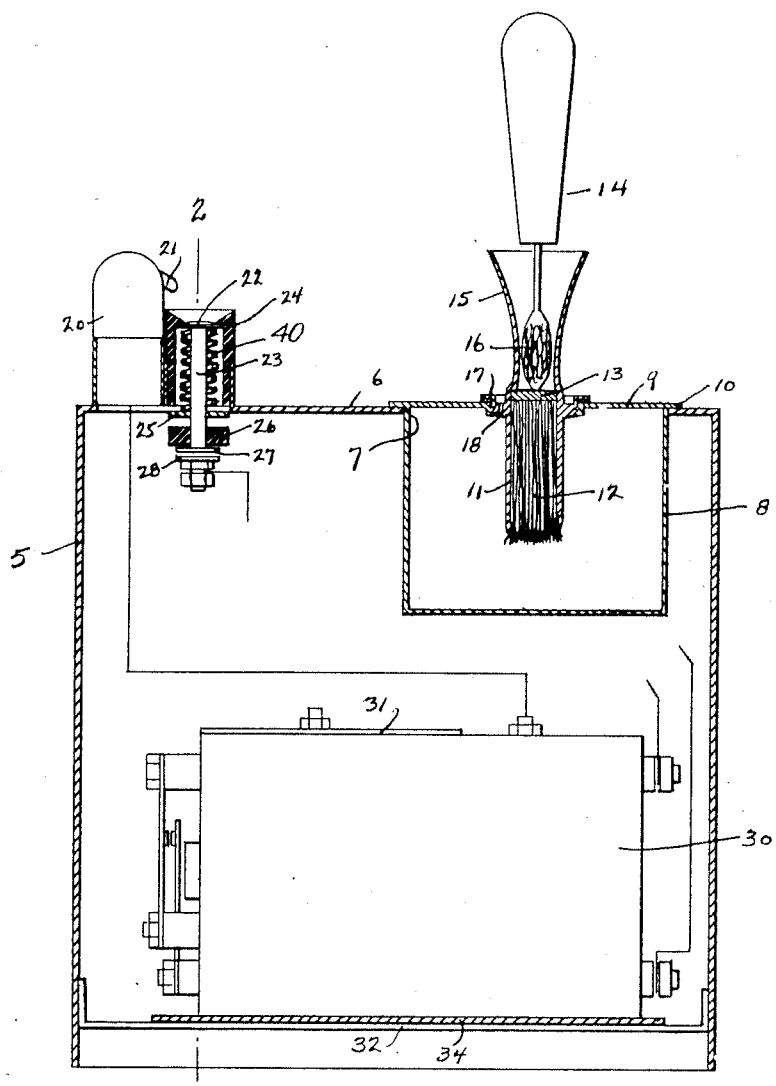
Fig. 1 is a side, sectional elevation of my device taken through the longitudinal centerline thereof.

It is obvious that the device is applicable to many uses, such as cigar lighter for smokers' stands or counter devices, or as a lighter for use in automobiles and kitchens. For convenience of illustration, I have shown the device adapted to a cigar lighter for use upon a counter.

In the drawings 5 represents the casing of the device which is provided in its top 6 with a large opening 7, in which rests the fuel tank 8. This fuel tank is provided with a top 9 having an overhanging flange 10, which serves to support the tank upon the top 6 of the casing. The fuel tank is provided with the usual filler opening into which is screw-threaded a cap 17 having a downwardly extending tube 11 which carries the wick 12 of the tank. A piece of felt 13 is preferably arranged at the upper end of the tube 11 and on top of the wick 12, and this forms a durable seat for the torch 14. An extinguishing funnel 15 is carried on the upper end of the tube 11 and serves not only as an extinguisher for the torch but as a support and holder for the same. The torch 14 is so constructed that it will not conduct electric current when it is used to close the circuit as hereinafter described. The torch is provided with an absorbent element 16, which may be of non-inflammable fabric, such as asbestos. The element 16 is designed so as to absorb sufficient fuel to be easily ignited and burn long enough to perform its lighting function. The fuel tank is entirely closed when the cap 17 is in place except for a small vent 18 provided therein. It will be seen that the torch is not dipped into the fluid in the fuel tank and, therefore, the fuel cannot become ignited or explode. The wick 12 and pad 13 are moist at all times and give to the torch the correct amount of fuel no matter what the level of the fuel in the tank may be.

Arranged in the top 6 of the casing and at one side of the fuel tank 7 is a porcelain standard 20, which carries a stationary electrode 21. Arranged adjacent this electrode 21 is a movable electrode 22 in the nature of a metallic plate which is carried at the upper end of a switch plunger 23. The electrode 22 and plunger 23 are mounted in a porcelain sleeve 24, also supported by the top 6 of the casing, whereby the movable, secondary electrode, formed by the plunger 23, is shielded, thus preventing the operator's hand from coming in contact therewith. The plunger 23 is of insulating material and passes through a ground plate 25 and a switch block 26, carried on the underside of the top 6, whereby its lower end is supported. A helical, ground spring 40 is disposed about the plunger 23 and serves to electrically connect the movable electrode 22 with the ground plate 25, whereby when a spark occurs, the current will be carried through the movable electrode 22 and through the spring 40, back to the casing 5 which is grounded on one side of the high tension current used in my device.

Figure 3:
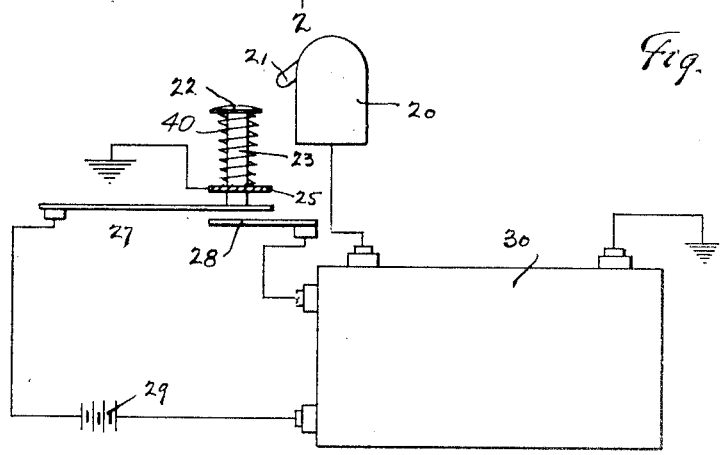
Fig. 3 is a diagrammatical view of the circuits of my device.
Figure 2:
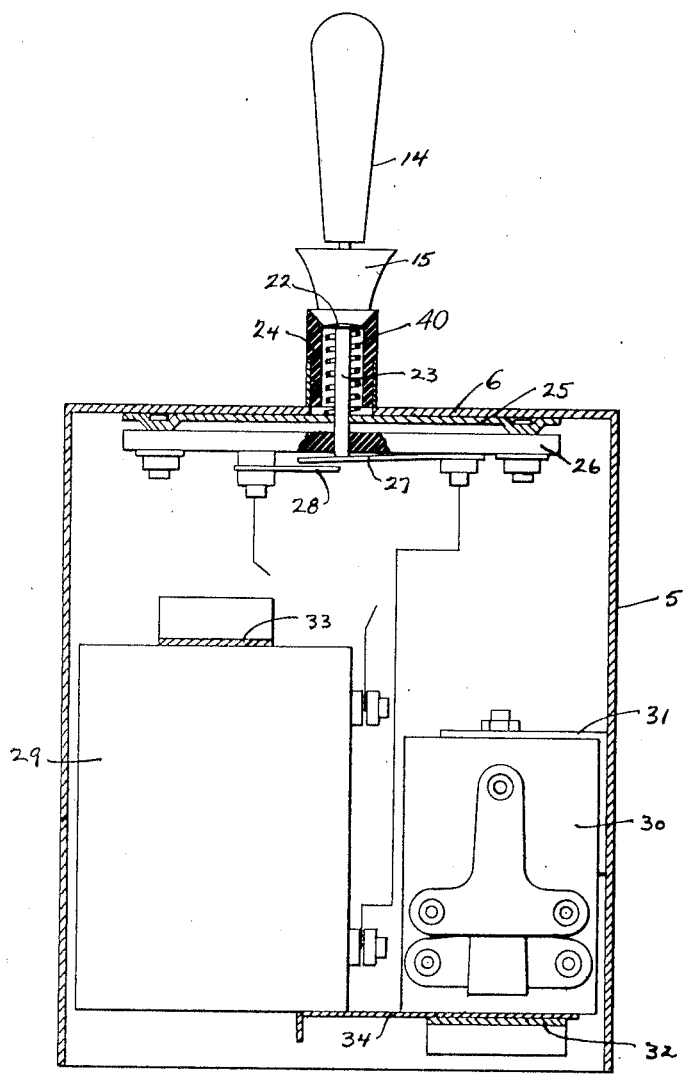
Fig. 2 is at transverse, sectional elevation taken on line 2—2 of Fig. 1.
Figure 4:
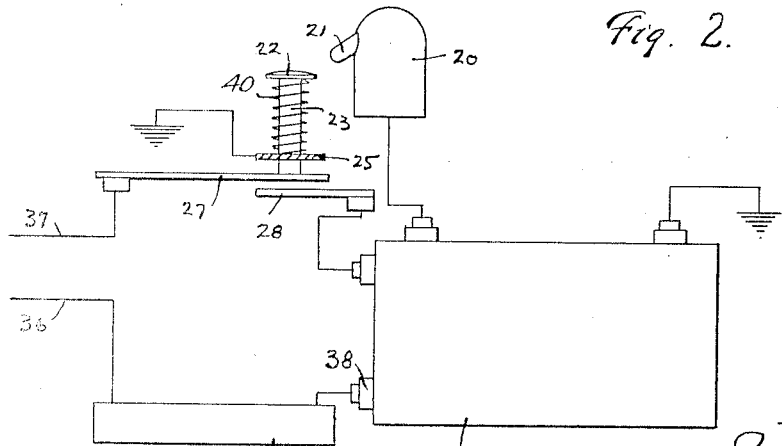
Fig. 4 is a similar view of the circuits of the device and shows it so equipped that current from a commercial line may be used instead of battery current.

Carried by the switch block 26 is a movable switch member 27 and a stationary switch member 28, normally separated and brought into contact by the downward movement of the plunger 23. As shown in the diagrammatical view of Fig. 3, the movable switch member 27 is connected to one side of a battery 29, carried in the casing 5, and the switch member 28 is connected to one terminal of the spark coil 30, also carried in the casing 5. The other primary terminal of the spark coil is connected to the opposite side of the battery 29. The stationary electrode 21 is suitably connected with one of the secondary or high tension terminals of the spark coil 30, and the other terminal of such spark coil is grounded to the casing, as shown diagrammatically in Fig. 3. This is preferably accomplished by having this terminal secured to an angle plate 31, which is secured to the interior of the casing 5. A strip of metal 32 is arranged below the spark coil 30, and a strip of metal 33 is arranged above the battery. A lock plate 34 is passed in between the bottom of the spark coil 30 and the strip 32, whereby the battery 29 will be held securely against the strip 33, as clearly shown in Fig. 2.

Where it is desired to use current from a commercial power line instead of the battery 29, a choke or resistance 35 is employed and is placed in series with the line current, having one end connected with one side 36 of the line and the other side with the primary terminal 38 of the spark coil. The other line 37 is connected with the movable switch member 27.

From the foregoing it will be clear that when the torch, which is kept saturated by contact with the felt washer 13, is lifted from the funnel 15 and pressed downwardly upon the movable electrode 22, the plunger 23 will serve to connect the movable switch member 27 with the stationary switch member 28, and thus close the primary circuit of the spark coil through the battery, thereby causing a secondary current to pass from the stationary electrode 21 to the movable electrode 22, and in the passing to ignite the saturated torch 14. When the torch is again placed in the funnel 15, the blaze is extinguished and the torch is supported until used again.

Obviously, some modifications of the details herein shown and described may be made without departing from the spirit of my invention, or the scope of the appended claims, and I do not, therefore, wish to be limited to the exact form herein shown and described, the form shown being merely a preferred form thereof.

Having thus described my invention, what I claim is:

1. A lighting device, associated with primary and secondary circuits, comprising a movable, secondary circuit electrode, a primary circuit switch actuated by the movable electrode, a stationary, secondary circuit electrode, and a torch element adapted to operate said movable electrode to close said switch.

2. A lighting device, associated with primary and secondary circuits, comprising a spring-pressed, movable, secondary circuit electrode, a primary circuit switch actuated by the movable electrode, a stationary, secondary circuit electrode, and a torch element adapted to operate said movable electrode to close said switch.

3. A lighting device, associated with primary and secondary circuits, comprising a plunger forming a secondary circuit electrode, a primary circuit switch actuated by the plunger, a stationary, secondary circuit electrode, and a torch adapted to depress said plunger to close said switch.

4. A lighting device, associated with primary and secondary circuits, comprising a movable, secondary circuit electrode, a plunger carried by the movable electrode, a helical, ground spring arranged about the plunger for grounding the movable electrode, a stationary, secondary circuit electrode, and a primary circuit switch actuated by the plunger, whereby the primary switch will be closed when the movable electrode is depressed.

In testimony whereof, I have hereunto signed my name.

JOSEPH L. SMITH.